United States Patent [19]
Hayashi et al.

[11] 3,857,831
[45] Dec. 31, 1974

[54] W-CARBOHYDROXYALKYL ESTERS OF PROSTAGLANDINS

[75] Inventors: Masaki Hayashi; Hajimu Miyake, both of Osaka, Japan

[73] Assignee: Ono Pharmaceutical Co., Ltd., Osaka, Japan

[22] Filed: Aug. 21, 1973

[21] Appl. No.: 390,269

[30] Foreign Application Priority Data
Aug. 24, 1972  Japan.................................. 47-84800

[52] U.S. Cl.......... 260/209 R, 260/413, 260/468 D, 260/514 D, 424/180, 424/305
[51] Int. Cl............................................. C07c 47/18
[58] Field of Search........... 260/413, 468 D, 514 D, 260/209 R

[56] References Cited
UNITED STATES PATENTS
3,775,462  11/1973  Axen............................ 260/468 D
3,816,393   6/1974  Hayashi et al. .............. 260/209 R Primary Examiner—Lewis Gotts
Assistant Examiner—Ethel G. Love
Attorney, Agent, or Firm—Albert H. Gaddis; Frank S. Chow

[57] ABSTRACT

Carboxyalkyl esters of prostaglandins of the general formula:

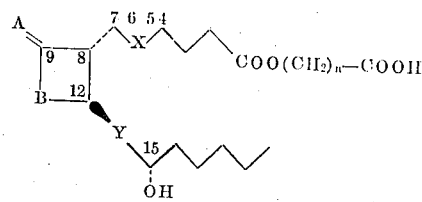

wherein A represents =O or

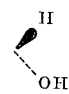

and B represents

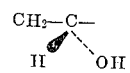

or, when A represents =O, additionally the group —CH=CH—, X represents —CH$_2$CH$_2$— or cis —CH=CH—, Y represents —CH$_2$CH$_2$— or trans —CH=CH—, and n represents an integer from 4 to 10, and cyclodextrin clathrates and non-toxic salts thereof are disclosed. These compounds exhibit characteristic prostaglandin-like activity and are useful in conditions such as hypertension and induction of labor.

13 Claims, No Drawings

W-CARBOHYDROXYALKYL ESTERS OF PROSTAGLANDINS

This invention relates to new prostaglandin compounds, to a process for their preparation and pharmaceutical compositions containing them.

Prostaglandins are generally known to possess pharmacological properties, for example they stimulate smooth muscle, have hypotensive and antilipolytic activities, and also inhibit blood platelet aggregation, and are, accordingly, useful in the treatment of hypertension, thrombosis, asthma and gastro-intestinal ulcers, in the induction of labour and abortion in pregnant female mammals, and in the prevention of arteriosclerosis. They are fat-soluble substances obtainable in very small quantities from various tissues of animals which secrete the prostaglandins in the living body.

Esters of prostaglandins are already known, their synthesis being effected by reaction of the prostaglandins with (i) diazoalkane compounds, e.g., diazomethane, (ii) alcohols in the presence of dicyclohexylcarbodiimide as condensing agent, or (iii) alcohols following the formation of a mixed acid anhydride by adding a tertiary amine and then pivaloyl halide, or an arylsulphonyl or alkylsulphonyl halide (cf. our Belgian Pat. Nos. 775106 and 776294).

Prostaglandin esters hitherto described and synthesized by the aforementioned methods exhibit in general pharmacological properties similar to the prostaglandins from which they are derived. Some of the prostaglandin esters are better in certain respects in that they possess a stronger pharmacological activity and/or have a longer duration of activity than the prostaglandins themselves. However, as compared with the prostaglandins, known prostaglandin esters have a far lower solubility in water due to the oleophilic group which they contain. This low water-solubility is a serious barrier to the medical utilisation of prostaglandin esters.

As a result of research and experimentation, it has now been found that when prostaglandins are esterified with a carboxyalkyl group, wherein the alkyl radical is straight-chained and contains from 4 to 10 carbon atoms, the water-solubility of the ω-carboxyalkyl esters of the prostaglandins is substantially greater than that of corresponding alkyl esters and, moreover, the carboxyalkyl esters can have improved pharmacological properties in comparison with the corresponding alkyl esters.

The present invention therefore provides the carboxyalkyl esters of prostaglandins of the general formula:

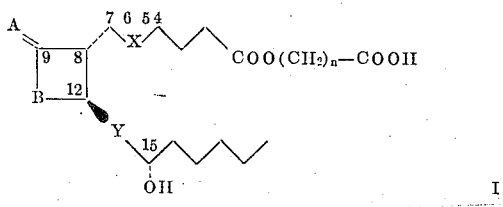

wherein A represents =O or

and B represents

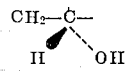

when A represents =O, additionally the group —CH=CH—, X represents —CH$_2$CH$_2$— or cis —CH=CH—, Y represents —CH$_2$CH$_2$— or trans —CH=CH—, and n represents an interfer from 4 to 10 (preferably 9), and cyclodextrin clathrates and non-toxic salts thereof.

It will be appreciated that by virtue of the definitions of symbols A and B the alicyclic ring of the above formula is that of prostaglandins E, F and A

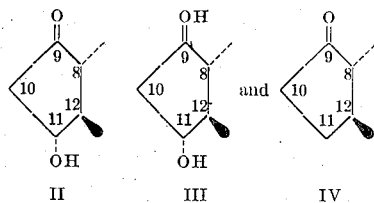

respectively.

The present invention is concerned with all compounds of general formula I in the "natural" form or its enantiomeric form, or mixtures thereof, more particularly the racemic form consisting of an equimolecular mixture of natural and its enantiomeric form.

As will be apparent to those skilled in the art, the compounds depicted in general formula I have at least three centres of chirality, these three centres being at the alicylic ring carbon atoms identified as 8 and 12 and at the C-15 carbon atom which has attached to it an α-hydroxy radical. Other centres of chirality occur when the alicyclic ring carries a hydroxy radical on the carbon atom in position 11 (i.e., when the ring is that of formula II) or hydroxy radicals in positions 9 and 11 (i.e., when the ring is that of formula III). The presence of chirality leads, as is well known, to the existence of isomerism. However, the compounds of formula I of the present invention all have such a configuration that the sidechains attached to the ring carbon atoms in the positions identified as 8 and 12 are trans with respect to each other. Accordingly, all isomers of general formula I, and mixtures thereof, which have those sidechains attached to the ring carbon atoms in positions 8 and 12 in the trans configuration and have an α-hydroxy radical in the 15-position are within the scope of the present invention. The hydroxy radical(s) in the alicyclic ring, when present, also has the α-configuration.

According to a feature of the present invention, the carboxyalkyl esters of prostaglandins of general formula I are prepared by the process which comprises hydrolyzing (or reducing compounds of the general formula:

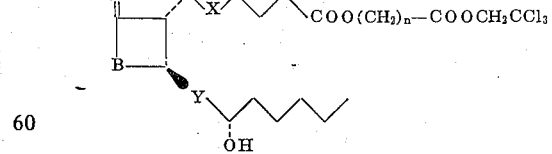

(wherein A, B, X, Y and n are as hereinbefore defined) to convert the ω-trichloroethoxycarbonyl group into a carboxy radical without affecting the other ester linkage.

The ω-trichloroethoxycarbonylalkyl esters of prostaglandins of general formula V employed as starting materials contain two ester bonds. The degrees of ease with which the two ester bonds may be hydrolyzed differ. In general, ester bonds are easily hydrolyzed under alkaline conditions but they are not hydrolyzed under acidic conditions. In the process of the invention hydrolysis of the trichloroethoxycarbonyl group to the carboxy radical is achieved easily using acetic acid in the presence of zinc powder. By such means hydrolysis of the other ester linkage is avoided.

The partial hydrolysis of starting materials of general formula V may be carried out in the following manner:

The compound of general formula V is dissolved in an aqueous acetic acid solution of a high concentration, zinc powder is added and the reaction mixture is stirred at a temperature from 0°C to room temperature. It is preferred to shorten the reaction time by following the reaction by thin-layer chromatography; generally the reaction is completed in about 1 to 5 hours. The liquid reaction mixture is then diluted with an organic solvent, e.g., ethyl acetate, and filtered to remove the zinc powder. The filtrate is washed with water and concentrated. If necessary, the product is purified by column chromatography.

The compounds of general formula V can be obtained as follows:

An ω-hydroxyalkylcarboxylic acid of the formula HO—$(CH_2)_n$COOH, wherein $n$ is as hereinbefore defined, is reacted with 2,2,2-trichloroethanol in the presence of dicyclohexylcarbodiimide as condensing agent to obtain the trichloroethyl ester of the ω-hydroxyalkylcarboxylic acid. The resulting ester of the formula HO—$(CH_2)_n$-COOCH$_2$CCl$_3$, wherein $n$ is as hereinbefore defined, is then reacted with a prostaglandin of the general formula:

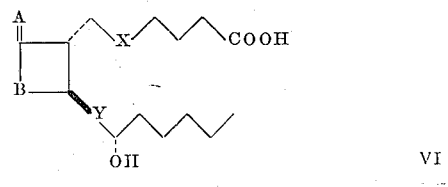

VI (wherein A, B, X and Y are as hereinbefore defined) to convert the prostaglandin into a compound of general formula V according to methods hitherto described for the preparation of prostaglandin esters and mentioned before in this specification under the references (ii) and (iii).

Prostaglandins of general formula VI which may be employed are prostaglandin $E_1$, prostaglandin $E_2$, dihydroprostaglandin $E_1$, prostaglandin $F_{1\alpha}$, prostaglandin $F_{2\alpha}$, dihydroprostaglandin $F_{1\alpha}$, prostaglandin $A_1$, prostaglandin $A_2$ and dihydroprostaglandin $A_1$.

The ω-carboxyalkyl esters of prostaglandins of general formula I obtained by the process of the present invention have an increased water-solubility and unexpectedly stronger pharmacological activity as compared with that of the corresponding alkyl esters, which activity is equal to or stronger than that of the prostaglandins from which they are derived. Furthermore the duration of activity of the new esters is longer than that of the fundamental prostaglandins. For example, when the 9-carboxynonyl ester of PGE$_2$ was administered intravenously to an allobarbital-anaesthetised dog at a dose of 0.5 μg/kg animal body weight a 18mm.Hg fall in blood pressure occurred for a duration of 12 minutes. When the same compound was administered in an amount of 1μg/kg animal body weight, the fall in blood pressure was 40 mm.Hg for a period of 40 minutes. In comparison, when the decyl ester of PGE$_2$ was similarly administered at a dose of 80 μg/kg animal body weight the fall in blood pressure of 22 mm.Hg continued for 60 minutes, and when PGE$_2$ itself was similarly administered at a dose of 1 μg/kg animal body weight the fall in blood pressure of 26 mm.Hg continued for a duration of only 7 minutes.

When the action of the 9-carboxynonyl ester of PGE$_2$ on bronchial muscles was examined according to its atonic action against contraction caused by histamine, the effect was equivalent to that produced by PGE$_2$.

Cyclodextrin clathrates of compounds of general formula I may be prepared by dissolving the cyclodextrin in water or an organic solvent which is miscible with water and adding to the solution the compound of general formula I in a water-miscible organic solvent. The mixture is then heated and the desired cyclodextrin clathrate product isolated by concentrating the mixture under reduced pressure or by cooling and separating the product by filtration or decanting. The ratio of organic solvent to water may be varied according to the solubilities of the starting materials and products. Preferably the temperature is not allowed to exceed 70°C during the preparation of the cylodextrin clathrates. α-, β- or γ-Cyclodextrins or mixtures thereof may be used in the preparation of the cyclodextrin clathrates. Conversion into their cyclodextrin clathrates serves to increase the stability of the compounds of general formula I.

Compounds of general formula I may, if desired, be converted by known methods into non-toxic salts.

By the term "non-toxic salts", as used in this specification, is meant salts the cations of which are relatively innocuous to the animal organism when used in therapeutic doses so that the beneficial pharmacological properties of the compounds of general formula I are not vitiated by side-effects ascribable to those cations. Suitable salts include alkali metal, e.g., sodium and potassium, and ammonium salts and pharmaceutically-acceptable (i.e., non-toxic) amine salts. Amines suitable for forming such salts with carboxylic acids are well known and include, for example, amines derived in theory by the replacement of one or more of the hydrogen atoms of ammonia by groups, which may be the same or different when more than one hydrogen atom is replaced, selected from, for example, alkyl groups containing from 1 to 6 carbon atoms and hydroxyalkyl groups containing from 1 to 3 carbon atoms.

The non-toxic salts may be prepared from parent compounds of general formula I by known methods, for example by reaction of stoichiometric quantities of compounds of general formula I and the appropriate base, e.g., an alkali metal hydroxide or carbonate, ammonium hydroxide, ammonia or an amine, in a suitable solvent. The salts may be isolated by lyophilisation of the solution or, if sufficiently insoluble in the reaction medium, by filtration, if necessary after removal of part of the solvent.

By the term "known methods" as used in the present specification is meant methods heretofore used or described in the chemical literature.

The following Example illustrates the invention.

EXAMPLE

1. Synthesis of 2,2,2-trichloroethyl 10-hydroxydecanoate

10-Hydroxydecanoic acid (5.53 g.) and 2,2,2-trichloroethanol (18 g.) are dissolved in methylene chloride (100 ml.) and anhydrous pyridine (12 ml.) was added.

The mixture is cooled to 0° –5°C., and a solution of dicyclohexylcarbodiimide (8.45 g.) in methylene chloride (20 ml.) is added and the reaction mixture stirred for 30 minutes. Stirring is continued for an additional 20 hours at room temperature. Acetic acid (10 ml.) is then added and the mixture stirred for 30 minutes to decompose the excess of dicyclohexylcarbodiimide. The crystalline precipitate is separated by filtration. The filtrate is diluted with diethyl ether, washed with dilute hydrochloric acid, water and aqueous sodium bicarbonate solution, dried with anhydrous sodium sulphate and concentrated under reduced pressure. The residue is purified by means of a column of silica gel. A mixture of ethyl acetate and cyclohexane (1:1) is used as eluent.

Infra-red absorption spectrum (liquid film method) 3320, 2920, 2850, 1740, 1440, 1375, 1220, 1140, 1105, 1060, 805, 760, 720 cm$^{-1}$; nuclear magnetic resonance spectrum (deuterochloroform) δ: 4.73 (2H, $-COOC\underline{H}_2CCl_3$), 3.84 – 3.35 (2H, $HO-C\underline{H}_2-$), 2.63 – 2.22 (2H, $-C\underline{H}_2COO$), 2.0 – 1.0 (remaining H).

2. Synthesis of PGE$_2$ 9-trichloroethoxycarbonylnonyl ester:

PGE$_2$ (613 mg.) is dissolved in methylene chloride (30 ml.). The solution is ice-cooled, triethylamine (195 mg) is added and the mixture stirred for 5 – 10 minutes; pivaloyl chloride (232 mg.) is then added. After stirring at room temperature for 30–60 minutes, 2,2,2-trichloroethyl 10-hydroxydecanoate (1.84 g.) and anhydrous pyridine (0.6 ml.) are added. The reaction mixture is then stirred at room temperature for 20 hours. It is then diluted with ethyl acetate, washed with aqueous oxalic acid solution and water, dried with anhydrous sodium sulphate, and concentrated under reduced pressure. The residue is purified with a column of silica gel (40 g.) using a mixture of cyclohexane and ethyl acetate (3:2) as eluent. Yield 450 mg. (40 percent); colourless oil.

Infra-red absorption spectrum (liquid film method) 3400, 2940, 2860, 1740, 1450, 1420, 1380, 1320, 1250, 1160, 1110, 1080, 975, 800, 760, 725 cm$^{-1}$; nuclear magnetic resonance spectrum (deuterochloroform) δ: 5.68 – 5.27 (4H, $-C\underline{H}=C-$), 4.75 (2H, $-COOC\underline{H}_2CCl_3$), 4.21 – 3.96 (4H, $-C\underline{H}-OH$, $-COOC\underline{H}_2CH_2-$), 2.75 (1H, C$_{10}$ β $-H$), 2.48 (2H, $-C\underline{H}_2COOCH_2CCl_3$), 2.30 (2H, $-C\underline{H}_2COOCH_2CH_2-$); thin layer chromatography (silica gel; chloroform: tetrahydrofuran: acetic acid = 10:2:1) Rf = 0.52.

3. Synthesis of PGE$_2$ 9-carboxynonyl ester

PGE$_2$ 9-trichloroethoxycarbonylnonyl ester (195 mg.) is dissolved in 90 percent aqueous acetic acid solution (30 ml.). Zinc powder (900 mg.) is added to the resulting solution and the reaction mixture is stirred at room temperature for 2 hours. It is then diluted with ethyl acetate, and zinc is separated by filtration. The filtrate is washed with water, dried with anhydrous sodium sulphate and concentrated under reduced pressure. The residue is purified by column chromatography. A column of silica gel (15 g.) is used, and a mixture of cyclohexane and ethyl acetate (1:1) is employed as eluent. Yield 120 mg. (78 percent); colourless oil.

Infra-red absorption spectrum (liquid film method) 3400, 2950, 2860, ~2400, 1740, 1710, 1450, 1420, 1380, 1320, 1250, 1160, 1110, 1075, 980 cm$^{-1}$; nuclear magnetic resonance spectrum (deuterochloroform) δ; 5.71 – 5.25 (7H, $-C\underline{H}=C$, $O\underline{H}$), 4.23 – 3.92 (4H, $-C\underline{H}-OH$, $-COOC\underline{H}_2CH_2-$), 2.75 (1H, C$_{10}$ β $-H$); thin layer chromatography (silica gel; chloroform: tetrahydrofuran:acetic acid = 10:2:1) Rf = 0.39. Elementary analysis (C$_{30}$H$_{50}$O$_7$); calculated: C 68.95 percent, H 9.58 percent; found: C 69.24 percent, H 9.71 percent.

Other ω-trichloroethoxycarbonylalkyl esters of prostaglandins are synthesized in the same manner as described hereinbefore under steps (1) and (2), and the resulting compounds are hydrolyzed in the same manner as described in step (3) to obtain other ω-carboxyalkyl esters of prostaglandins. Yields and physicochemical constants of thus obtained compounds are shown in the following Table.

TABLE (Part 1)

| Compound | Yield (%) | Appearance | Infrared absorption spectrum (liquid film method, cm$^{-1}$) |
| --- | --- | --- | --- |
| PGF$_{1\alpha}$ 5-carboxypentyl ester | 86 | colourless oil | 3350, 2940, 2860, ~2300, 1710, 1460, 1420, 1380, 1325, 1250, 1160, 1105, 1080, 980 |
| PGF$_{2\alpha}$ 9-carboxynonyl ester | 82 | do. | 3400, 2950, 2860, ~2400, 1710, 1465, 1420, 1380, 1320, 1250, 1160, 1110, 1080, 980 |
| PGE$_1$ 7-carboxyheptyl ester | 75 | do. | 3400, 2950, 2860, ~2400, 1740, 1710, 1455, 1420, 1380, 1325, 1250, 1160, 1110, 1075, 985 |
| PGA$_2$ 4-carboxybutyl ester | 80 | do. | 3350, 2950, 2860, ~2400, 1710, 1590, 1450, 1380, 1325, 1250, 1180, 1110, 1080, 980 |
| Dihydro-PGE$_1$ 9-carboxynonyl ester | 76 | do. | 3400, 2960, 2860, ~2350, 1740, 1705, 1450, 1410, 1380, 1320, 1250, 1160, 1110, 1080 |

TABLE (Part 2)

| Compound | N.M.R. spectrum (deuterochloroform solution, $\delta$) | | Elementary analysis Calculated (%) | Found (%) |
|---|---|---|---|---|
| PGF$_1\alpha$ 5-carboxypentyl ester | 5.74 - 5.45<br>4.90<br>4.23 - 3.93 | (2H, C$\underline{H}$=C)<br>(4H, O$\underline{H}$)<br>(5H, C$\underline{H}$ - OH)<br>COOC$\underline{H}_2$CH$_2$) | C: 66.38<br><br>H: 9.79 | C: 66.56<br><br>H: 9.70 |
| PGF$_2\alpha$ 9-carboxynonyl ester | 5.72 - 5.08<br>4.22 - 3.90 | (8H, C$\underline{H}$=C, O$\underline{H}$)<br>(5H, C$\underline{H}$ - OH,<br>COOC$\underline{H}_2$CH$_2$) | C: 68.70<br><br>H: 9.92 | C: 68.74<br><br>H: 9.71 |
| PGE$_1$ 7-carboxyheptyl ester | 5.93 - 5.43<br>4.24 - 3.92<br><br>2.75 | (5H, C$\underline{H}$=C, O$\underline{H}$)<br>(4H, C$\underline{H}$ - O$\underline{H}$,<br>-COOC$\underline{H}_2$CH$_2$)<br>(1H, C$_{10}\beta$-$\underline{H}$) | C: 67.74<br><br>H: 9.68 | C: 68.06<br><br>H: 9.50 |
| PGA$_2$ 4-carboxybutyl ester | 7.52 (1H, C$_{11}$ - H) 6.15<br>(1H, C$_{10}$ - H) 5.72 - 5.26<br>(4H, C$\underline{H}$=C) 5.22 - 4.80 (2H, O$\underline{H}$)<br>4.20 - 3.79 (3H, C$\underline{H}$OH, COOC$\underline{H}_2$CH$_2$)<br>3.36 - 3.17 (C$_{12}$ - H) | | C: 69.12<br><br><br>H: 8.73 | C: 69.40<br><br><br>H: 8.82 |
| Dihydro-PGE$_1$ 9-carboxynonyl ester | 6.00<br>4.23 - 3.94<br><br>2.74 | (3H, O$\underline{H}$)<br>(4H, C$\underline{H}$ - OH,<br>COOC$\underline{H}_2$CH$_2$)<br>(1H, C$_{10}\beta$-$\underline{H}$) | C: 68.44<br><br>H: 10.27 | C: 68.52<br><br>H: 10.07 |

The invention includes within its scope pharmaceutical compositions which comprise at least one prostaglandin compound of general formula I, or a cyclodextrin clathrate or a non-toxic salt thereof, together with a pharmaceutical carrier or coating. In clinical practice the novel compounds of the present invention will normally be administered orally, rectally, vaginally or parenterally.

Solid compositions for oral administration include compressed tablets, pills, dispersible powders, and granules. In such solid compositions one or more of the active compounds is, or are, admixed with at least one inert diluent such as calcium carbonate, potato starch, alginic acid or lactose. The compositions may also comprise, as is normal practice, additional substances other than inert diluents, e.g., lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Solid compositions for vaginal administration include pessaries formulated in manner known per se and containing one or more of the active compounds.

Solid compositions for rectal administration include suppositories formulated in manner known per se and containing one or more of the active compounds.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also include adjuvants such as preserving, wetting, emulsifying and dispersing agents. They may be sterilised, for example, by filtration through a bacteria-retaining filter, by incorporation of sterilising agents in the compositions, or by irradiation. They may also be manufactured in the form of sterile solid compositions, which can be dissolved in sterile water or some other sterile injectable medium immediately before use.

The compounds of the invention may be administered orally as bronchodilators by any method known per se for administration by inhalation of drugs which are not themselves gaseous under normal conditions of administration. Thus, a solution of the active ingredient in a suitable pharmaceutically-acceptable solvent, for example water, can be nebulized by a mechanical nebulizer, for example a Wright Nebulizer, to give an aerosol of finely-divided liquid particles suitable for inhalation. The solution may contain stabilizing agents such as sodium bisulphite and buffering agents to give it an isotonic character, e.g., sodium chloride, sodium citrate and citric acid.

The active ingredients may also be administered orally by inhalation in the form of aerosols generated from self-propelling pharmaceutical compositions. Compositions suitable for this purpose may be obtained by dissolving or suspending in finely-divided form the active ingredients in pharmaceutically-acceptable solvents, e.g., ethanol, which are co-solvents assisting in dissolving the active ingredients in the volatile liquid propellants hereinafter described, or pharmaceutically-acceptable suspending or dispersing agents, for example aliphatic alcohols such as oleyl alcohol, and incorporating the solutions or suspensions obtained with pharmaceutically-acceptable volatile liquid propellants, in conventional pressurized packs which may be made of any suitable material, e.g., metal, plastics or glass, adequate to withstand the pressures generated by the volatile propellant in the pack. Pressurized pharmaceutically-acceptable gases, such as nitrogen, may also be used as propellants. The pressurized pack is preferably fitted with a metered valve which dispenses a controlled quantity of the self-propelling aerosol composition as a single dose.

Suitable volatile liquid propellants are known in the art and include fluorochlorinated alkanes containing from one to four, and preferably one or two, carbon atoms, for example dichlorodifluoromethane, dichlorotetrafluoroethane, trichloromonofluoromethane, dichloromonofluoromethane and monochlorotrifluoromethane.

Means for producing self-propelling compositions for generating aerosols for the administration of medicaments are, for example, described in detail in U.S. Pat. Nos. 2,868,691 and 3,095,355.

It is important that the pH of solutions and suspensions used, according to the present invention, to generate aerosols should be kept within the range 3 to 8 and preferable that they should be stored at or below 4°C., to avoid pharmacological deactivation of the active ingredient.

In carrying out the present invention, the means of producing an aerosol for inhalation should be selected in accordance with the physico-chemical properties of the active ingredient.

By the term "pharmaceutically-acceptable" as applied in this specification to solvents, suspending or dispersing agents, propellants and gases is meant solvents, suspending or dispersing agents, propellants and gases which are non-toxic when used in aerosols suitable for inhalation therapy.

Generally speaking, these compounds are indicated in the management of hypertension. In humans, for example, an intravenous dose of 10–50 micrograms/kg or an oral dose of 0.2 to 1 mg/kg is suggested. This dosage regimen can be varied depending upon the age, sex and severity of the condition being treated.

We claim:

1. Carboxyalkyl esters of prostaglandins of the general formula:

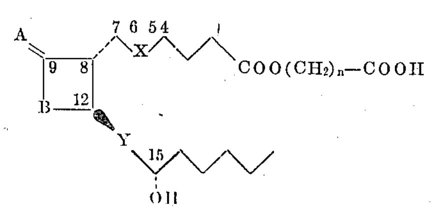

wherein A represents =0 or 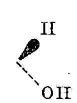 and B represents 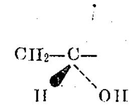 or, when A represents =O, additionally the group —CH=CH—, X represents $—CH_2CH_2—$ or cis —CH=CH—, Y represents $—CH_2CH_2—$ or trans —CH=CH—, and n represents an integer from 4 to 10, and cyclodextrin clathrates and non-toxic salts thereof.

2. Prostaglandin compounds according to claim 1 in which the alicyclic ring in the formula is that of prostaglandin E.

3. Prostaglandin compounds according to claim 1 in which the alicyclic ring in the formula is that of prostaglandin F.

4. Prostaglandin compounds according to claim 1 in which the alicyclic ring in the formula is that of prostaglandin A.

5. Prostaglandin compounds according to claim 1, 2, 3 or 4 wherein *n* represents 9.

6. 9-Carboxynonyl ester of $PGE_2$ and cyclodextrin clathrates and non-toxic salts thereof.

7. 9-Carboxynonyl ester of $PGF_{2\alpha}$ and cyclodextrin clathrates and non-toxic salts thereof.

8. 9-Carboxynonyl ester of dihydro-$PGE_1$ and cyclodextrin clathrates and non-toxic salts thereof.

9. 5-Carboxypentyl ester of $PGF_{1\alpha}$ and cyclodextrin clathrates and non-toxic salts thereof.

10. 7-Carboxyheptyl ester of $PGE_1$ and cyclodextrin clathrates and non-toxic salts thereof.

11. 4-Carboxybutyl ester of $PGA_2$ and cyclodextrin clathrates and non-toxic salts thereof.

12. Process for the preparation of carboxyalkyl esters of prostaglandins as claimed in claim 1 which comprises hydrolysing compounds of the general formula:

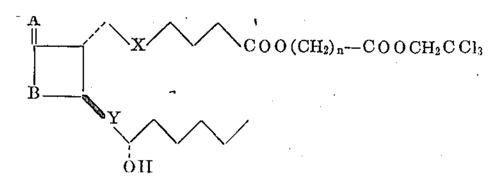

(wherein A, B, X, Y and *n* are as defined in claim 1) to convert the ω-trichloroethoxycarbonyl group into a carboxy radical without affecting the other ester linkage.

13. Process according to claim 12 in which the hydrolysis is carried out with acetic acid in the presence of zinc powder.

* * * * *